(12) United States Patent
Kishima et al.

(10) Patent No.: US 7,058,000 B2
(45) Date of Patent: *Jun. 6, 2006

(54) INFORMATION RECORDING DISC HAVING AN ANTI-REFLECTION LAYER AND INFORMATION RECORDING/REPRODUCING APPARATUS

(75) Inventors: Koichiro Kishima, Kanagawa (JP); Isao Ichimura, Tokyo (JP); Yuji Kuroda, Tokyo (JP); Kiyoshi Osato, Chiba (JP)

(73) Assignee: Sony Corporation (JP)

( * ) Notice: Subject to any disclaimer, the term of this patent is extended or adjusted under 35 U.S.C. 154(b) by 196 days.

This patent is subject to a terminal disclaimer.

(21) Appl. No.: 10/748,280

(22) Filed: Dec. 31, 2003

(65) Prior Publication Data

US 2004/0154037 A1     Aug. 5, 2004

Related U.S. Application Data

(63) Continuation of application No. 09/731,771, filed on Dec. 8, 2000, now Pat. No. 6,683,846.

(51) Int. Cl.
*G11B 3/70*     (2006.01)

(52) U.S. Cl. .................. 369/283; 369/286; 369/275.4; 720/719

(58) Field of Classification Search .......... 369/112.23, 369/283, 284, 275.3, 275.4, 275.5, 286; 720/719; G11B 3/70
See application file for complete search history.

(56) References Cited

U.S. PATENT DOCUMENTS

| 5,251,202 | A | | 10/1993 | Kaneko et al. |
| 5,311,494 | A | | 5/1994 | Sugita et al. |
| 5,371,730 | A | * | 12/1994 | Maeda et al. ............... 720/725 |
| 5,783,320 | A | | 7/1998 | Shimazaki et al. |
| 6,049,521 | A | | 4/2000 | Aratani |
| 6,128,274 | A | | 10/2000 | Mori et al. |
| 6,146,734 | A | | 11/2000 | Ohno et al. |
| 6,160,769 | A | | 12/2000 | Ohnuki et al. |
| 6,552,968 | B1 | * | 4/2003 | Kishima et al. ......... 369/13.38 |
| 6,683,846 | B1 | * | 1/2004 | Kishima et al. ............ 369/286 |
| 6,934,224 | B1 | * | 8/2005 | Kuroda et al. ............. 369/13.4 |

FOREIGN PATENT DOCUMENTS

| EP | 0 469 623 A2 | 2/1992 |
| JP | 59-231751 | 12/1984 |

* cited by examiner

*Primary Examiner*—A M Psitos
(74) *Attorney, Agent, or Firm*—Rader, Fishman & Grauer PLLC; Ronald P. Kananen (57) ABSTRACT

An anti-reflection coating layer is formed on the surface portion of a recording medium. This enables to obtain a margin for the air gap thickness change when recording/reproducing an information signal using the "near-field technique" as well as minimize a data loss caused by a collision. Furthermore, the present invention provides a film configuration which can easily be produced.

35 Claims, 12 Drawing Sheets

INFORMATION RECORDING DISC HAVING AN ANTI-REFLECTION LAYER AND INFORMATION RECORDING/REPRODUCING APPARATUS

RELATED APPLICATION

This application is a continuation of application Ser. No. 09/731,771, filed Dec. 8, 2000, now U.S. Pat. No. 6,683,846, patented on Jan. 27, 2004 [application Ser. No. 09/731,771, filed on Dec. 8, 2000].

BACKGROUND OF THE INVENTION

1. Field of the Invention

The present invention relates to an information recording disc and an information recording/reproducing apparatus.

2. Description of the Prior Art

Conventionally, an information recording disc and an apparatus for recording and reproducing an information signal using the information recording disc have been suggested. As such an information recording disc, there can be exemplified a so-called optical disc, a magneto-optical disc, a hard disc, and the like.

Figure 1:
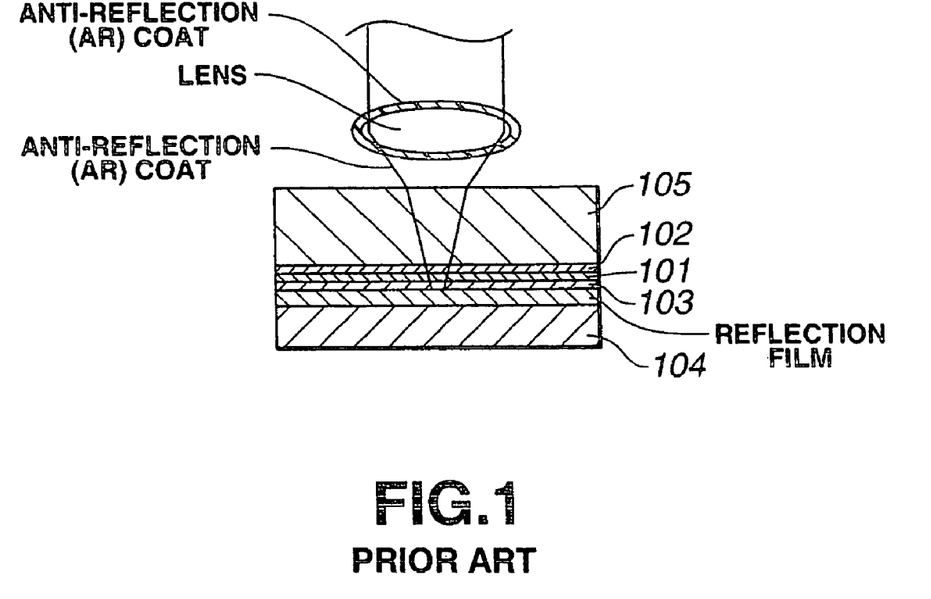
FIG. 1 is a cross sectional view showing a configuration of a conventional magneto-optical disc and an objective lens as an essential portion of an information recording/reproducing apparatus.

The so-called magneto-optical disc includes, as shown in FIG. 1, a signal recording layer (MO film) 101 which is sandwiched by dielectric films 102 and 103 having an enhancement effect. The signal recording layer 101 and the dielectric films 102, 103 are protected by a protection film 104 and the substrate 105 and a cover material, respectively, and they are not exposed outside. Accordingly, in this magneto-optical disc, there is no danger of contact or collision of the signal recording layer 101 and the dielectric films 102, 103 with an objective lens or a magnetic head of an optical pick-up apparatus, and there is no need of countermeasures for preventing such contacts or collisions.

Figure 2:
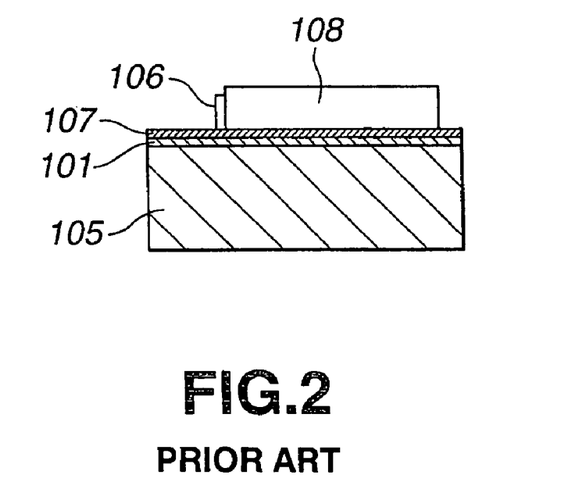
FIG. 2 is a cross sectional view showing a configuration of a conventional hard disc and a magnetic head as an essential portion of an information recording/reproducing apparatus.

Moreover, in the so-called hard disc, when reproducing an information signal recorded or recording an information signal onto the information recording disc, as shown in FIG. 2, it is preferable that the signal recording layer 101 formed on the substrate 105 of the information recording disc be in the vicinity of the magnetic head 106, requiring no optical condition. Accordingly, a lubrication film 107 coated with a thin film of a lubricant is formed between the magnetic head 106 and the information recording disc. The lubricant often used contains fluoride for its characteristics. The magnetic head 106 is mounted on and supported by a slider 108.

Recently, in the case of optical disc also, as in the hard disc, an optical disc apparatus in which the signal recording layer is in the proximity with the objective lens of the optical pick-up apparatus has been developed. As such an optical disc, a so-called "optical hard disc apparatus" and a "near-field optical disc apparatus" have been suggested. In the optical hard disc apparatus, an object lens is mounted and supported by a slider. In the near-field optical disc apparatus, an objective lens have a numerical aperture (NA) not smaller than 1 although not having the configuration of mounting the objective lens by the slider.

Figure 3:
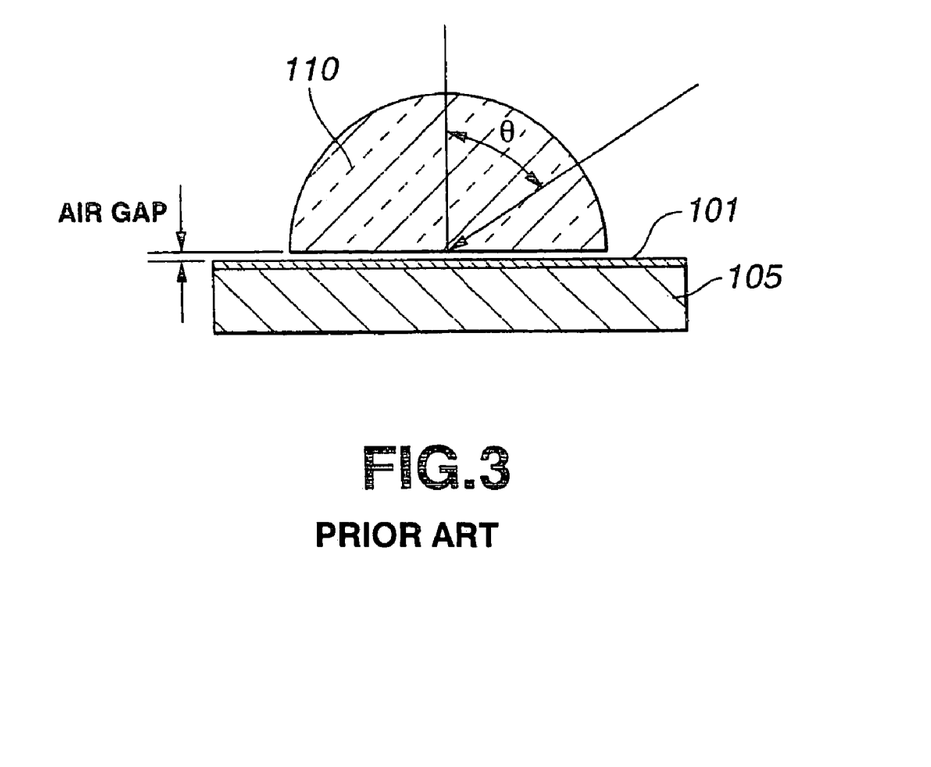
FIG. 3 is a cross sectional view showing a configuration of a conventional near-field optical disc and a SIL (solid immersion lens) as an essential portion of an information recording/reproducing apparatus.

As shown in FIG. 3, in the "near-field optical disc apparatus", the objective lens is a so-called solid immersion lens (SIL) 110 whose first surface is arranged in the proximity of the surface portion of the information recording disc and the first surface of the SIL 110 is arranged in a so-called near-field region with respect to that surface portion.

Figure 4:
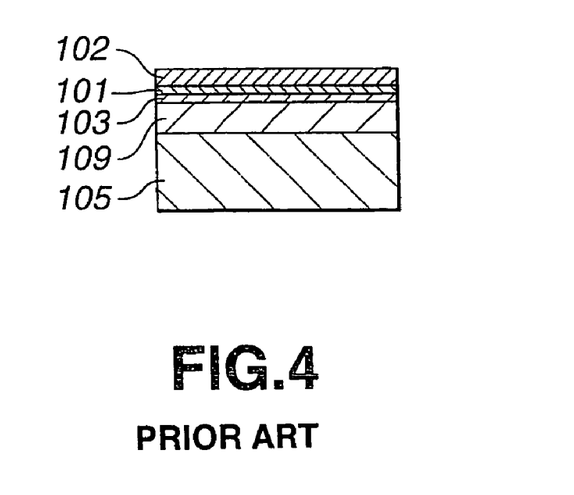
FIG. 4 is a cross sectional view shown a configuration of a conventional near-field optical disc.

An information recording disc used in such an "optical hard disc apparatus" includes, as shown in FIG. 4, a reflection film 109, a second dielectric film 103, a signal recording layer 101, and a first dielectric film 102 successively arranged from the side of the substrate 105. The information recording disc having the four-layered films consisting of the reflection film 109, the second dielectric film 103, the signal recording layer 101, and the first dielectric film 102 is designed so as to obtain the enhancement effect for increasing a recording data contrast for a light incident vertically to the substrate 105.

In the information recording/reproducing apparatus configured as the so-called "optical hard disc apparatus", the signal recording layer of the information recording disc is in the proximity of the objective lens of the optical pick-up apparatus and there is a possibility that the signal recording layer collides into the objective lens. Here, when the signal recording layer is coated with a lubricant, if there is any film thickness irregularity in the coating, this causes irregularities in the optical characteristic. Accordingly, it is necessary to reduce the film thickness irregularities.

Moreover, as the lubricant for the near-field optical disc apparatus, a fluoride-system material is not appropriate because it has a low refractive index. Thus, in the near-field optical disc apparatus, it is difficult to select an appropriate lubricant.

Moreover, in the optical hard disc apparatus, it is preferable that the first surface of the objective lens including a boundary in the proximity be coated with an anti-reflection coating (AR coating), so that fluctuations of a distance between the information recording disc and the objective lens will not affect the optical characteristics.

However, since the objective lens is in the proximity of the information recording disc, the objective lens easily collide into the information recording disc and such collision may peel off the anti-reflection coating. If the anti-reflection coating is peeled off from the objective lens, the optical characteristic of the entire apparatus is changed, disabling a preferable recording/reproducing of an information signal. Thus, it is difficult to select a film formation material of the anti-reflection coating as well as to handle the coating.

Figure 5:
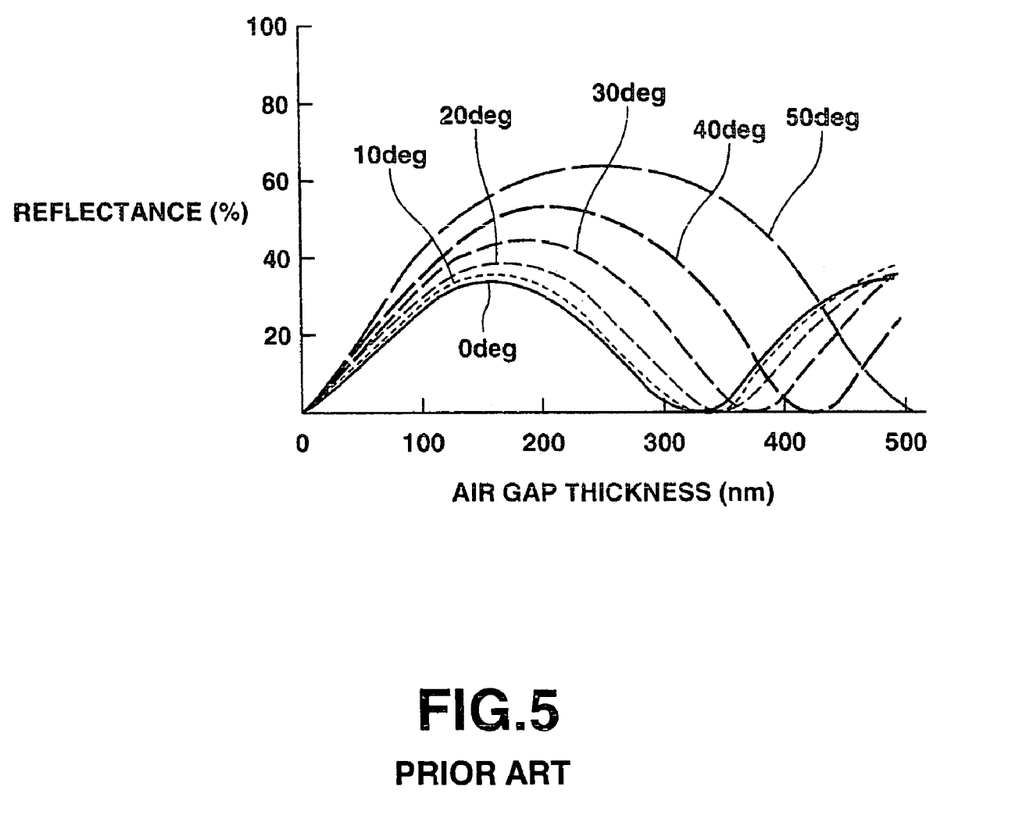
FIG. 5 graphically shows the relationship between an air gap and a reflectance in the aforementioned conventional information recording disc and the information recording/reproducing apparatus.

Furthermore, in the aforementioned configuration, among a light flux applied to the information recording disc, a component having a high numerical aperture (NA) cannot reach the signal recording layer easily. That is, assume that an air film between the information recording disc and the SIL is a thin film having a refraction index (n) of 1, the calculation result of dependency of the reflectance of the first dielectric film on the incident angle when incident via an air gap having a thickness t from the SIL as an optical part having a refractive index (n) of 1.8 shows that different incident angles corresponding to the numerical apertures fluctuate the intensity of the light incident into the first dielectric film as shown in FIG. 5. Furthermore, when the optical system is designed for an air gap having a thickness of 50 nm, the fluctuation of the air gap thickness drastically changes the reflectance, easily causing fluctuation of the light energy distribution.

Figure 6:
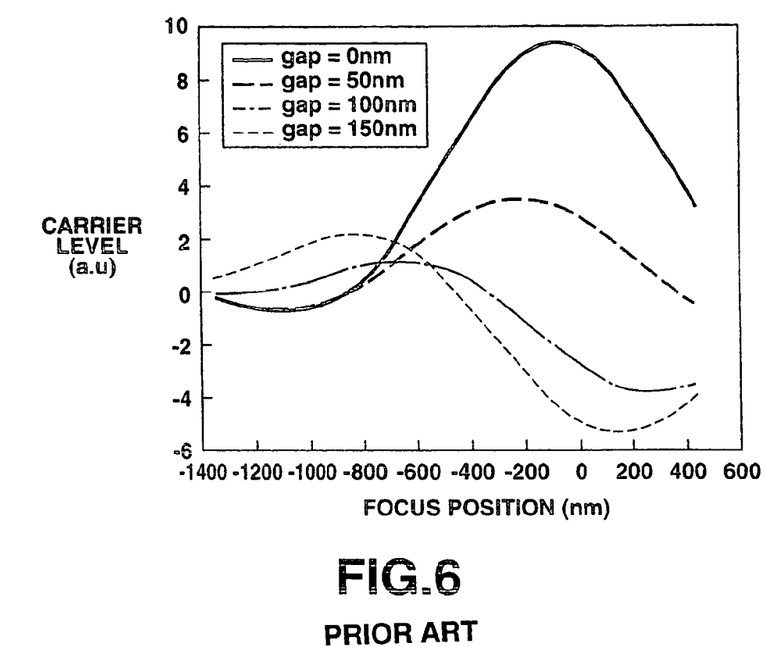
FIG. 6 graphically shows the relationship between an air gap thickness and a focus position where the reproduction signal carrier level becomes maximum in the aforementioned conventional information recording disc and the information recording/reproducing apparatus.
Figure 7:
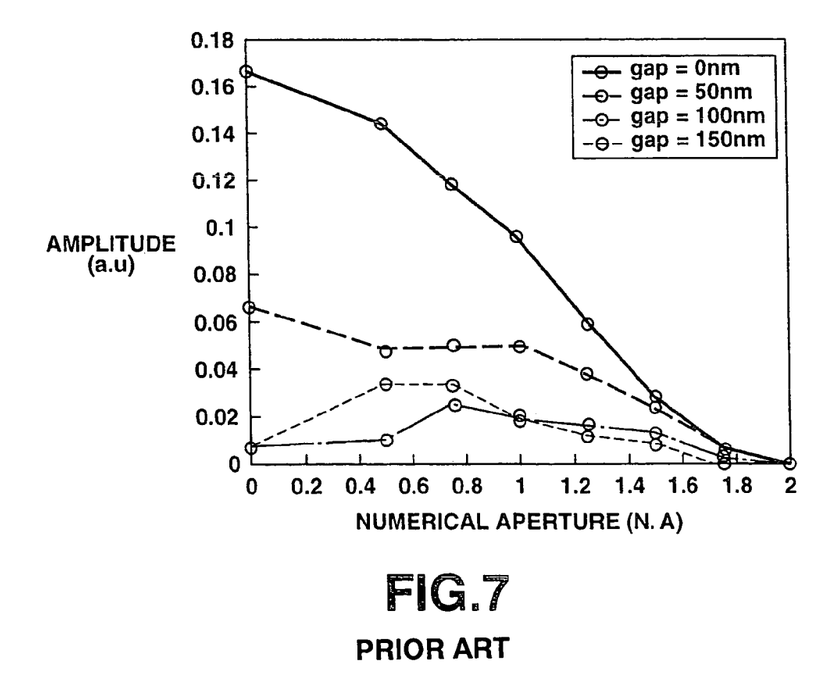
FIG. 7 graphically shows the relationship between the air gap thickness and the MTF (modulation transfer function) at the focus position shown in FIG. 6 where the reproduction signal carrier level becomes maxim in the aforementioned conventional information recording disc and the information recording/reproducing apparatus.

Moreover, as shown in FIG. 6 and FIG. 7, a calculation result of the modulation transfer function (MTF) shows that increase of the air gap thickness between the information recording disc and the SIL easily deteriorates the MTF.

Furthermore, in the information recording disc having the film configuration shown in FIG. 4, the outermost surface opposing to the SIL is a film made from $ZnS$—$SiO_2$. This $ZnS$—$SiO_2$ is a very soft material and is easily damaged when a collision with the SIL occurs. In the hard disc, polishing is performed to improve the surface characteristic. However, when the outermost surface is made from a soft material such as $ZnS$—$SiO_2$, polishing cannot be performed.

Moreover, in this information recording disc, an abrasion phenomenon is easily caused during an information recording, which causes a problem that the film is removed and rubbish is easily generated.

SUMMARY OF THE INVENTION

It is therefore an object of the present invention to provide an information recording disc having a film configuration that can easily be prepared and capable of having a sufficient margin for a thickness change of an air gap between the disc and a focusing element when recording/reproducing an information signal using the so-called near-field technique as well as minimizing a data amount lost when a collision with the focusing element occurs. The present invention also provides an information recording/reproducing apparatus for recording/reproducing an information signal using the information recording disc.

In order to achieve the aforementioned object, the present invention provides an information recording disc including a signal recording layer for use in an information recording/reproducing apparatus having a light source for emitting a light flux and a focusing element for focusing the light flux to be applied to the signal recording layer, wherein the signal recording layer is positioned approximately on a surface portion facing to the focusing element and the surface portion is coated with an anti-reflection coating film.

According to another aspect of the present invention, the information recording disc including a signal recording layer for use in an information recording/reproducing apparatus having a light source for emitting a light flux and a focusing element for focusing the light flux to be applied to the signal recording layer, wherein the distance between the focusing element and a surface portion facing to the focusing element is not greater than a wavelength of the light flux, and wherein the surface portion facing to the focusing element is coated with an anti-reflection coating film.

Moreover, the present invention provides an information recording/reproducing apparatus comprising: a rotation mechanism for holding and rotating an information recording disc; a light source; and a focusing element for focusing a light flux emitted from the light source so as to be applied to a signal recording layer of the information recording disc.

In this information recording/reproducing apparatus, the information recording disc is used in such a manner that a distance between the focusing element and the surface portion facing to this focusing element is not greater than a wavelength of the light flux, and the information recording disc includes an anti-reflection coating film formed on the surface portion facing to the focusing element.

DETAILED DESCRIPTION OF PREFERRED EMBODIMENTS

Description will now be directed to an embodiment of the present invention with reference to the attached drawings.

Figure 8:
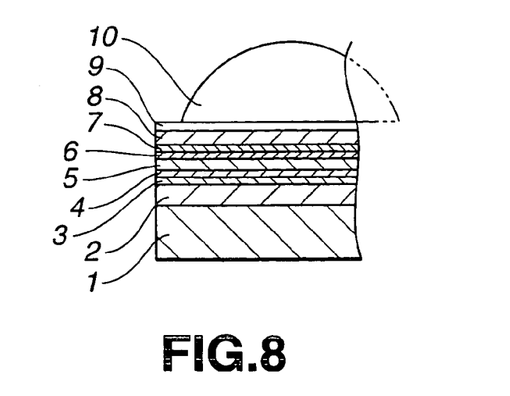
FIG. 8 is a cross sectional view showing a configuration of an information recording disc and a focusing element as an essential portion of an information recording/reproducing apparatus according to the present invention.

As shown in FIG. 8, this embodiment is configured as an information recording disc for recording/reproducing an information recording disc according to the present invention using the so-called near-field technique. Moreover, in this embodiment, the recording/reproducing apparatus according to the present invention is configured as an information recording/reproducing apparatus for recording/reproducing an information onto/from an information recording disc using the so-called near-field technique.

As shown in FIG. 8, this information recording disc is configured as a phase change type disc (phase change medium) including a reflection film 2 made from aluminum (Al), a second dielectric film 3, a signal recording layer 4, and a first dielectric film 5 successively formed from the side of the substrate 1. The reflection film 2, the second dielectric film 3, the signal recording layer 4, and the first dielectric layer 5 constitute the enhancement condition with respect to a light focus component vertically incident to the substrate 1, i.e., the enhancement condition at the beam west. Furthermore, the first dielectric film 5 is coated with an anti-reflection coating consisting of a third, a fourth, and fifth dielectric film 6, 7, 8. The anti-reflection coating consisting of the third, the fourth, and the fifth dielectric film 6, 7, 8 enables to obtain an anti-reflection condition, with respect to the first dielectric film 5, for the light incident from a focusing element, i.e., the SIL (solid immersion lens) 10 and having an angle against the surface of the information recording disc.

When the wavelength used is 650 nm, the first dielectric film 5 is made from ZnS—SiO$_2$ having a thickness of 100 nm and a refractive index (n) of 2.16; the second dielectric film 3 is made from ZnS-SiO$_2$ having a thickness of 40 nm and a refractive index (n) of 2.16; the third dielectric film 6 is made from SiO$_2$ having a thickness of 15 nm and a refractive index (n) of 1.47; the fourth dielectric film 7 is made from SiN having a thickness of 50 nm and a refractive index (n) of 2.0; and the fifth dielectric film 8 is made from SiO$_2$ having a thickness of 200 nm and a refractive index (n) of 1.47. The signal recording layer 4 is made from Ge$_2$Sb$_2$Te$_5$ having a thickness of 20 nm and a refractive index (n) of 3.9.

Figure 9:
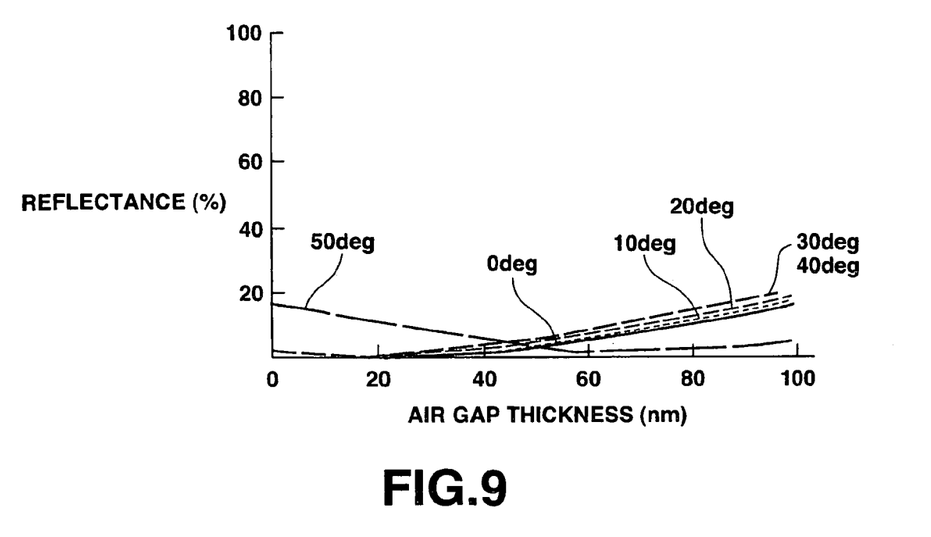
FIG. 9 graphically shows the relationship between the air gap thickness and the reflectance in the information recording disc and the information recording/reproducing apparatus shown in FIG. 8.

FIG. 9 shows calculation results of incident angle dependency of the reflectance of the first dielectric film 5 when the air film 9 is considered to have a refractive index (n) of 1 and an optical part having a refractive index (n) of 1.8 is used via the air gap 9 having a thickness of t. When the air gap 9 has a thickness of 50 nm, for example, the anti-reflection coating function in such a way that the reflectance of the first dielectric film 5 is not greater than 10% for the light ray of the incident angle up to 50°. This shows that in this information recording disc, the coupling efficiency is increased and the coupling efficiency change is gentle for the change of the air gap thickness.

Furthermore, in this information-recording disc, the outermost surface 8 facing to the SIL 10 is made from SiO$_2$ and the film 8 is not easily damaged even when the SIL 10 collides into the outermost surface 8.

In the convention information recording disc, the outermost surface is made from ZnS—SiO$_2$ which is soft and it has been difficult to perform burnishing. In contrast to this, in the information recording disc according to the present embodiment, the outermost surface is made from SiO$_2$ and it is possible to perform burnishing. Accordingly, it is possible to remove any protrusions made by an abnormal discharge in the sputtering when forming the signal recording layer 4.

Furthermore, since the fifth dielectric film 8 forming the outermost surface has a thickness not less than 100 nm, a gentle margin is available in burnishing.

Moreover, in this information recording disc, even when the SIL 10 as the focusing element collides into the surface portion, causing a peel off, only the data of the portion where the anti-reflection coating is peeled off is lost, which is by far less than the data loss when SIL 10 has the anti-reflection coating which is peeled off. On the other hand, when the anti-reflection coating film is formed on the side of the SIL 10 and the film is peeled off, the optical condition is changed for a data recording/reproducing over the entire surface of the information recording disc.

Figure 10:
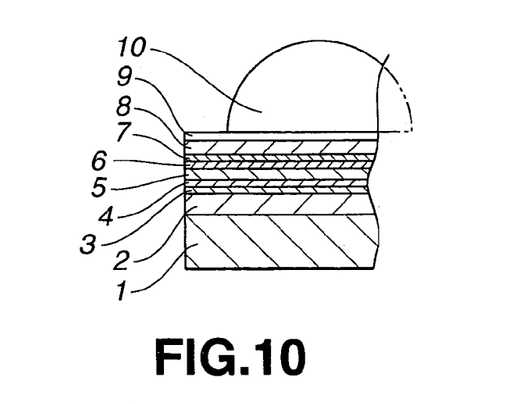
FIG. 10 is a cross sectional view showing another example of the configuration of the aforementioned information recording disc and the focusing element as an essential portion of the information recording/reproducing apparatus.

When the signal recording layer is a magneto-optical (MO) recording film, the information recording disc has a film configuration as shown in FIG. 10, including a reflection film 2, a second dielectric film 3, a signal recording layer 4, and a first dielectric film 5 successively formed from the side of the substrate 1. The reflection film 2, the second dielectric film 3, the signal recording layer 4, and the first dielectric film 5 constitute the enhancement condition for the light flux component vertically incident into the substrate 1, i.e., the enhancement condition at the beam west. Furthermore, the first dielectric film 5 is coated with an anti-reflection coating consisting of a third, a fourth, and a fifth dielectric film 6, 7, 8. The anti-reflection coating consisting of the third, the fourth, and the fifth dielectric film 6, 7, 8 constitutes the anti-reflection condition, with respect to the first dielectric film 5, for the light ray incident from the focusing element, i.e., the SIL (solid immersion lens) 10 and having an angle against the surface of the information recording disc.

When the wavelength used is 650 nm, the first dielectric film 5 is made from SiN having a thickness of 100 nm and a refractive index (n) of 2.00; the second dielectric film 3 is made from SiN having a thickness of 20 nm and a refractive index (n) of 2.0; the third dielectric film 6 is made from SiO$_2$ having a thickness of 10 nm and a refractive index (n) of 1.47; the fourth dielectric film 7 is made from SiN having a thickness of 50 nm and a refractive index (n) of 2.0; and the fifth dielectric film 8 is made from $SiO_2$ having a thickness of 200 nm and a refractive index (n) of 1.47. The signal recording layer 4 is made from TbFeCo having a thickness of 20 nm and a refractive index (n) of 3.13 and GbFeCo having a thickness of 4 nm and a refractive index (n) of 2.86.

Figure 11:
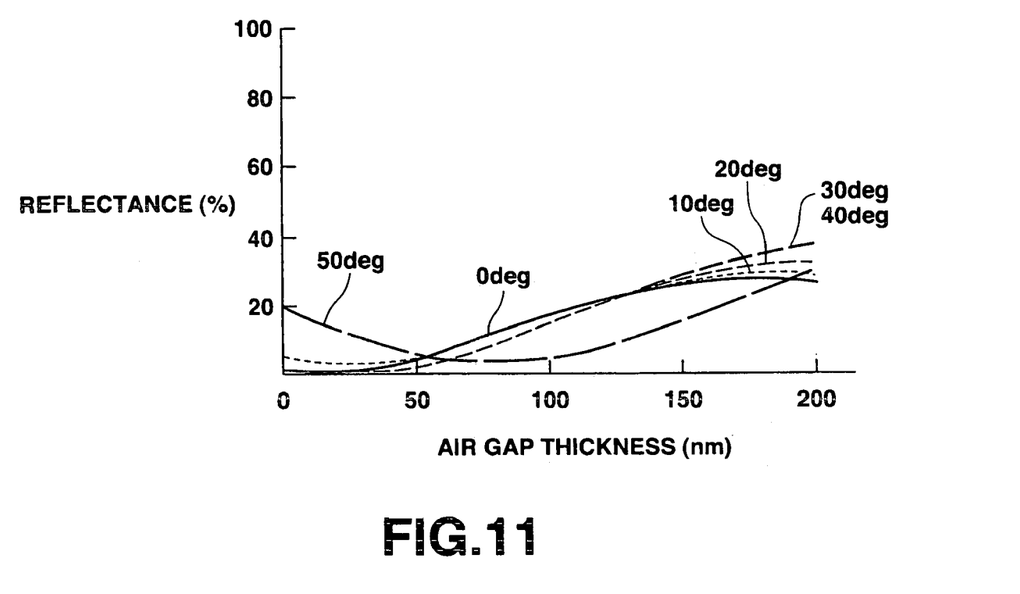
FIG. 11 graphically shows the relationship between the air gap thickness and the reflectance in the information recording disc and the information recording/reproducing apparatus shown in FIG. 10.

FIG. 11 shows a calculation result of the incident angle dependency of the reflectance of the first dielectric film 5 when the air film 9 is considered to have a refractive index (n) of 1, an optical part having a refractive index (n) of 1.8 is used, and the air gap 9 having a thickness of t intervenes. When the air gap 9 has a thickness of 50 nm, for example, the anti-reflection coating makes the reflectance of the first dielectric film 5 be not greater than 10% for light rays of the incident angle up to 50°. This result shows that in the information recording disc, the coupling efficiency is increased and the change of the coupling efficiency is gentle for the change of the air gap thickness.

Furthermore, in this information recording disc, the outermost surface portion opposing to the SIL 10 is made from $SiO_2$. That is, even when the SIL 10 collides into the outermost surface, the signal recording layer 4 weak to oxidation will not easily be exposed outside.

In this information recording disc having the outermost surface made from $SiO_2$, it is possible to perform burnishing. Accordingly, it is possible to remove any protrusions formed due to an abnormal discharge during sputtering for forming the signal recording layer 4.

Furthermore, since the fifth dielectric film 8 serving as the outermost surface has a thickness not less than 100 nm, a gentle margin is available for burnishing.

Moreover, in this information recording disc, when the SIL 10 as the focusing element collides into the surface portion, causing a peel-off, the data loss occurs only in the portion where the anti-reflection coating has been peeled off unlike the case when the anti-reflection coating film is formed at the side of SIL 10 and the film has been peeled off.

It should be noted that in the aforementioned embodiments, explanation has been given on a specific example when the wavelength used is 650 nm, the air film has a thickness of 50 nm, and the focusing element (SIL 10) has a refractive index (n) of 1.8. However, the information recording disc according to the present invention is not to be limited to these conditions. Moreover, in the aforementioned embodiments, explanation has been given on a configuration having a signal recording layer as a phase change film and a magneto-optical recording film. However, the information recording disc according to the present invention is not to be limited to the configuration of such a recording film and may have an information recording layer dedicated for a signal reproduction.

The information recording/reproducing apparatus according to the present invention includes a rotation/operation mechanism for holding and rotating/operating the aforementioned information recording disc. Moreover, this information recording/reproducing apparatus includes a light source and a SIL (solid immersion lens) as a focusing element for focusing the light flux emitted from the light source and applying it to a signal recording layer. The SIL is an approximately hemispheric lens having a flat portion facing to the information recording disc, so that the light flux incident from the spherical portion is applied via the flat portion onto the information recording disc. The light flux emitted from the light source is incident from the spherical portion via an optical element such as a condenser.

Figure 12:
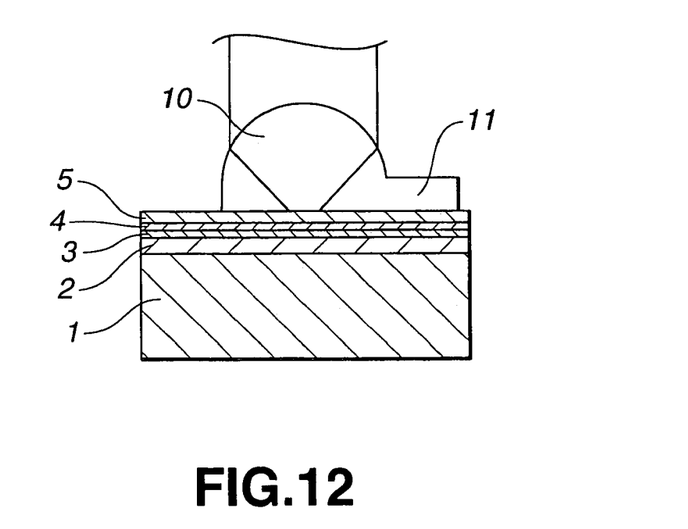
FIG. 12 is a side view showing a support structure of the focusing element in the aforementioned information recording/reproducing apparatus.
Figure 13:
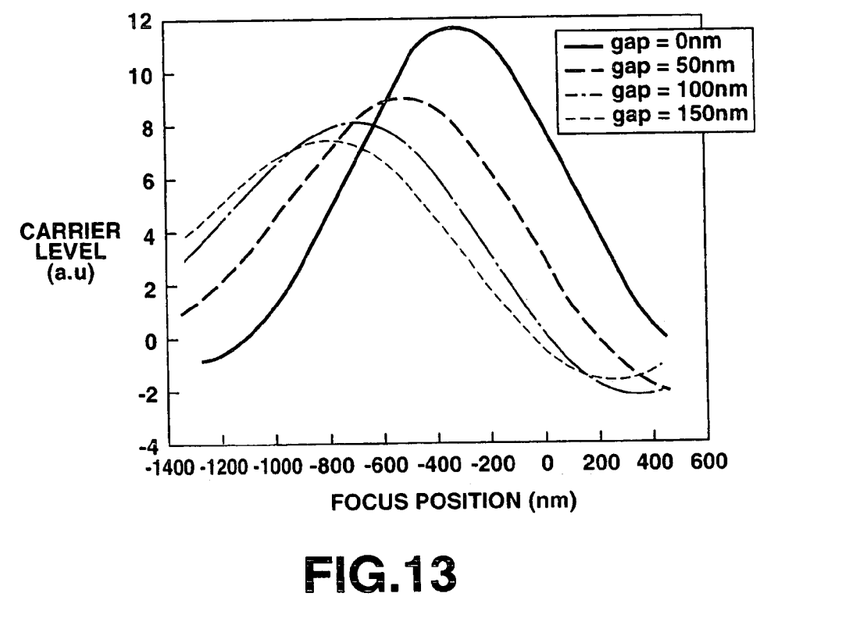
FIG. 13 graphically shows the relationship between the air gap thickness and the focus position where the reproduction signal carrier level becomes maximum in the aforementioned information recording disc and the information recording/reproducing apparatus.

In this information recording/reproducing apparatus, the information recording disc is used in such a manner that the distance between the flat surface of the SIL and a surface portion facing to the SIL is not greater than the wavelength of the light flux for recording/reproducing. In order to maintain such a small distance between the SIL and the information recording disc, the distance between the SIL and the information recording disc is measured and the measurement result is fed back for servo operation for moving the SIL, or as shown in FIG. 12, the SIL 10 is mounted on a slider member 11 used in a hard disc and the SIL 10 is made to face the information recording disc, so that the SIL 10 is maintained at a predetermined distance from the information recording disc by an air gap formed between the information recording disc and the slider member by rotation of the information recording disc.

In a so-called near-field region where the distance between the flat portion of the SIL and the surface of the information recording disc is equal to or less than the wavelength of the light flux for recording/reproducing, an evanescent light is caused from the SIL to the information recording disc and a light flux is applied to the information recording disc.

In the aforementioned information recording disc and the information recording/reproducing apparatus according to the present invention, the anti-reflection coating layer of the information recording disc has an effect to suppress the aberration for the medium, which facilitates a wide recording margin and dust is not easily generated.

Figure 14:
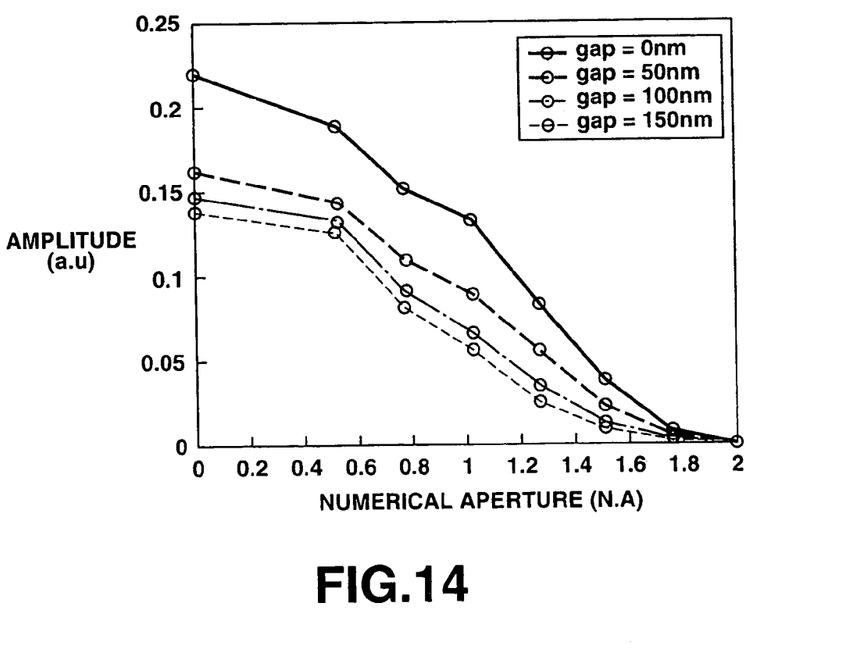
FIG. 14 graphically shows the relationship between the air gap thickness and the MTF at the focus position shown in FIG. 13 where the reproduction signal carrier level becomes maximum in the aforementioned information recording disc and the information recording/reproducing apparatus.
Figure 15:
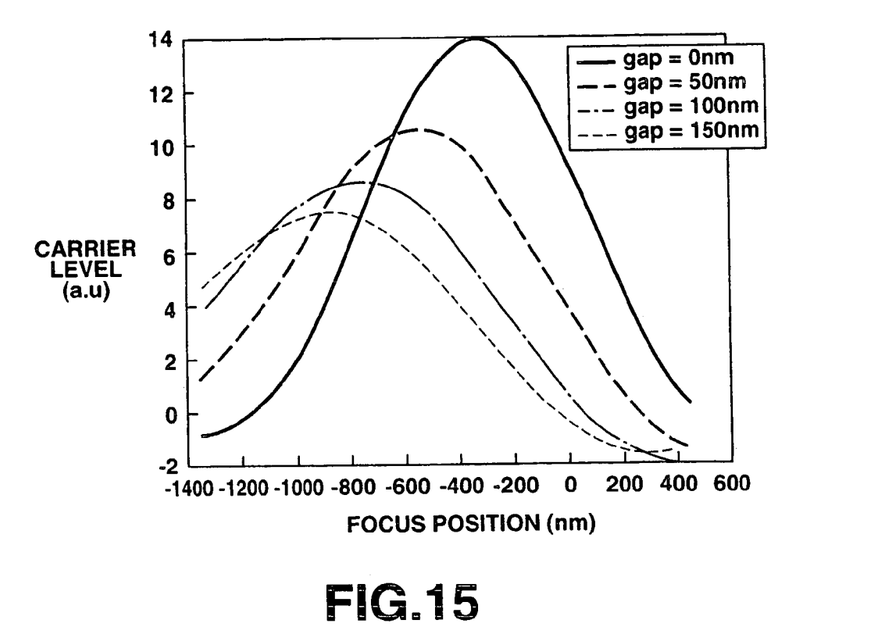
FIG. 15 graphically shows the relationship between the air gap thickness and the focus position where the reproduction signal carrier level becomes maximum in the aforementioned information recording disc and the information recording/reproducing apparatus.
Figure 16:
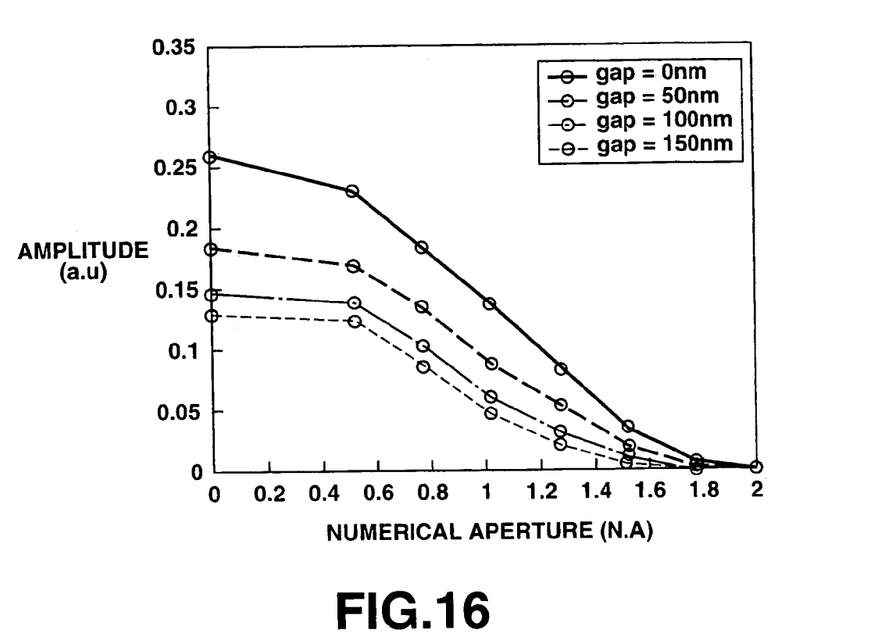
FIG. 16 graphically shows the relationship between the air gap thickness and the MTF at the focus position shown in FIG. 15 where the reproduction signal carrier level becomes maximum in the aforementioned information recording disc and the information recording/reproducing apparatus.

Furthermore, in the calculation result of the MTF (modulation transfer function), deterioration is little even when the air gap between the SIL and the information recording disc increases its thickness. That is, when the information recording disc has a surface coated with an anti-reflection coating, deterioration of the MTF can be drastically improved as shown in FIG. 14, FIG. 15, and FIG. 16.

Figure 17:
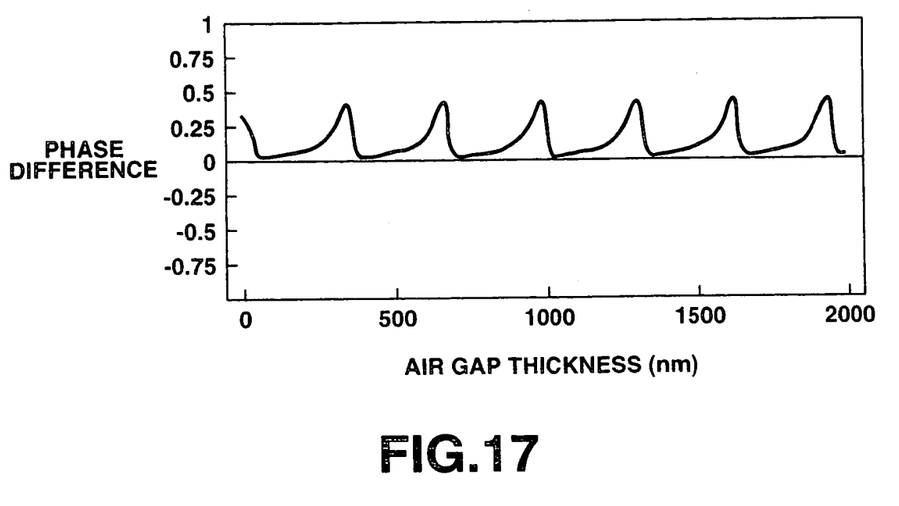
FIG. 17 graphically shows the relationship between the air gap thickness and the phase characteristic in the aforementioned information recording disc and the information recording/reproducing apparatus.

Moreover, in the phase change type optical disc, although the phase condition is important, only a small affect is observed in relation to the phase change and the reproduction margin is wide as shown in FIG. 17.

Figure 18:
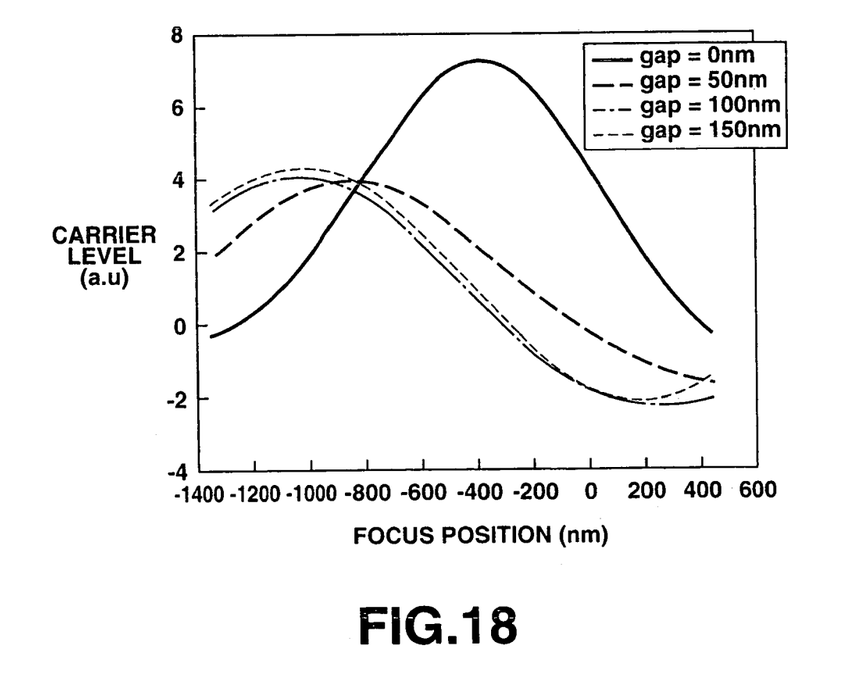
FIG. 18 graphically shows the relationship between the air gap thickness in an information recording disc having a single-layered anti-reflection coating and the focus position where the reproduction signal carrier level becomes maximum.
Figure 19:
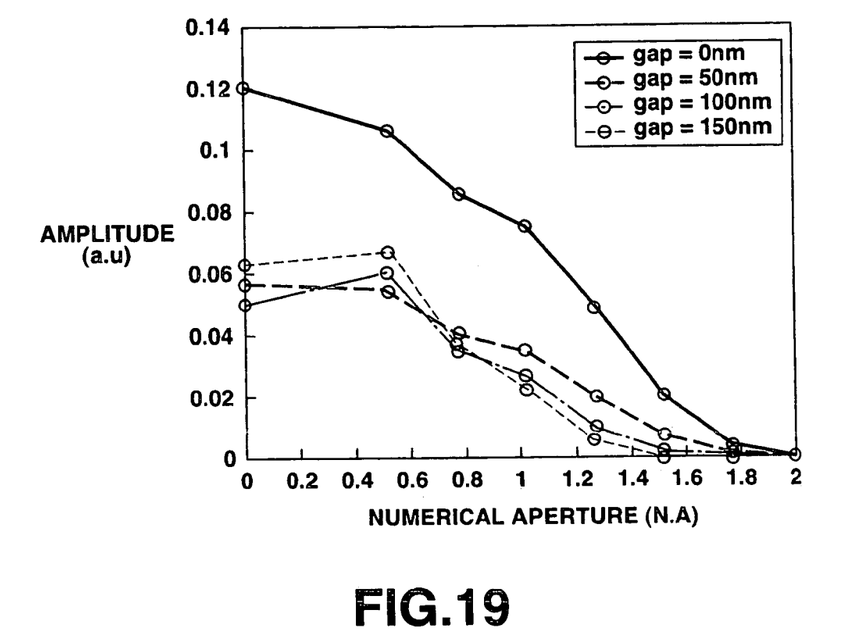
FIG. 19 graphically shows the relationship between the air gap thickness in an information recording disc having a single-layered anti-reflection coating and the MTF at the focus position shown in FIG. 18 where the reproduction signal carrier level becomes maximum.
Figure 20:
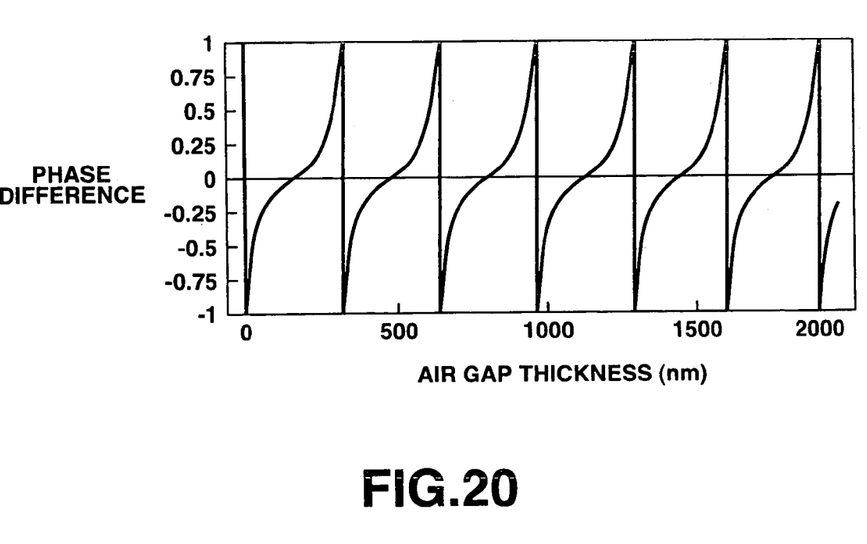
FIG. 20 graphically shows the relationship between the air gap thickness and the phase characteristic in an information recording disc having a single-layered anti-reflection coating.

Furthermore, in a single-layered coat made from only $SiO_2$, as shown in FIG. 18 and FIG. 19, deterioration of the MTF can be suppressed. In the case of the phase change type optical disc in which the phase condition is also important, an excessive sensitivity in relation to the phase change is observed as shown in FIG. 20 causing a problem in a practical use but the MTF characteristic is preferable.

That is, when using a phase-change type medium, the condition of use is strict but when using a magneto-optical (MO) material, a single-layered coating film is sufficient.

Figure 21:
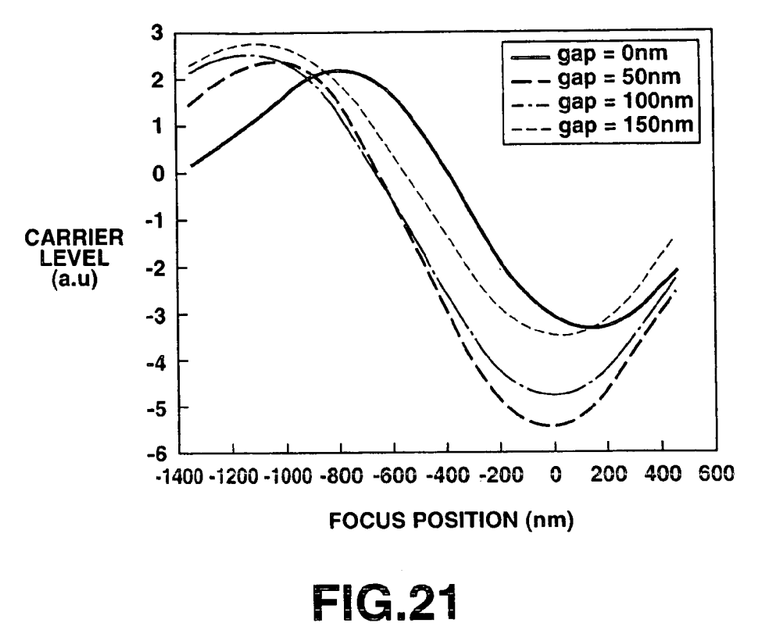
FIG. 21 graphically shows the relationship between the air gap thickness and the focus position where the reproduction signal carrier level becomes maximum in an information recording disc having a coating not satisfying the anti-reflection condition.
Figure 22:
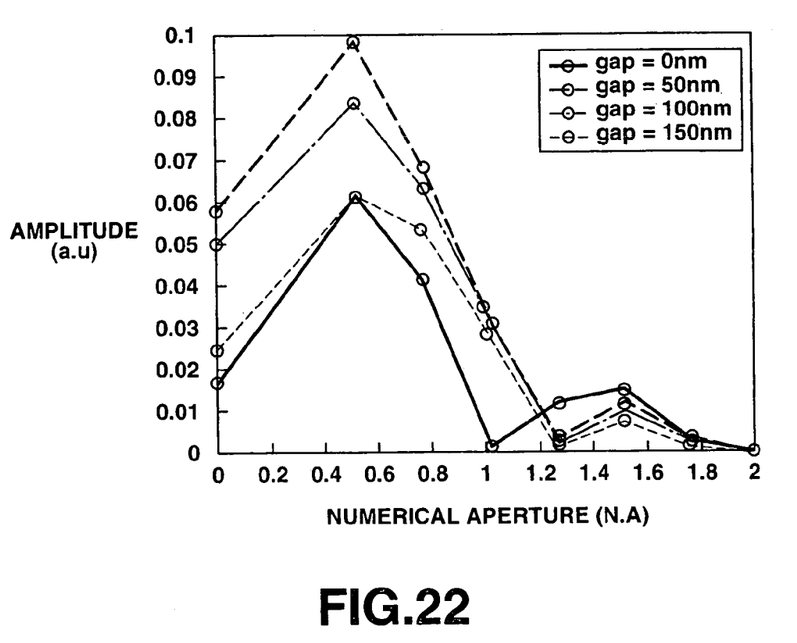
FIG. 22 graphically shows the relationship between the air gap thickness and the MTF in an information recording disc having a coating not satisfying the anti-reflection condition.
Figure 23:
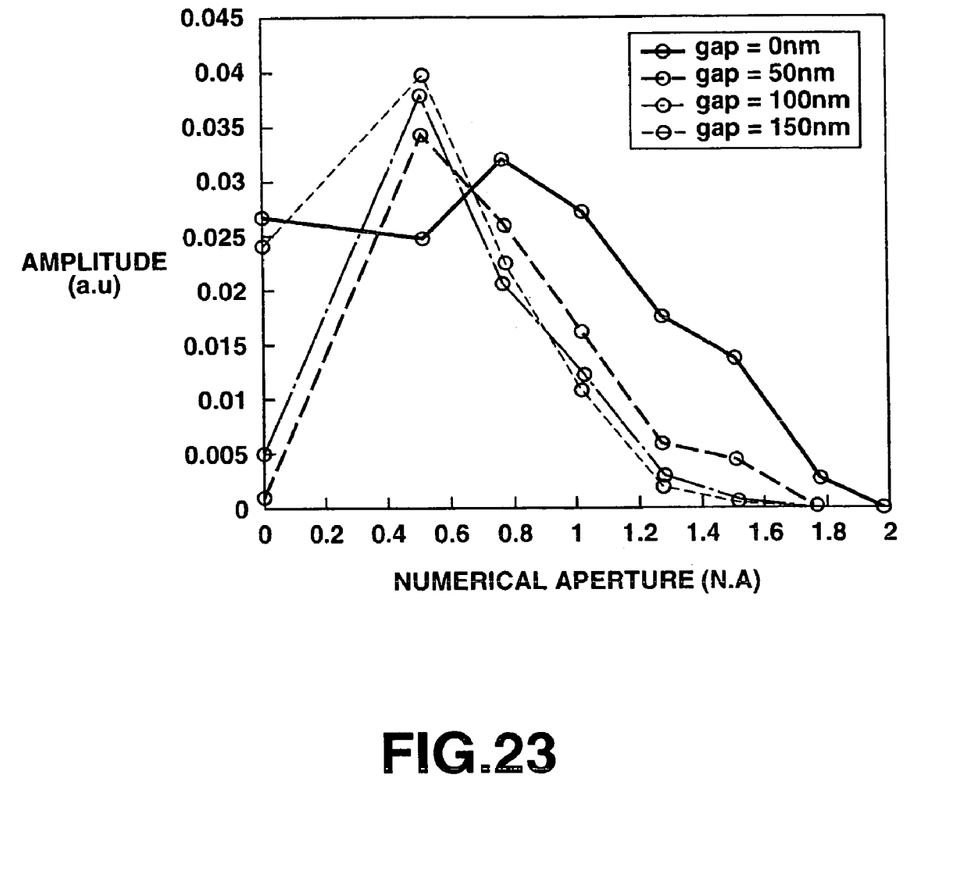
FIG. 23 graphically shows the relationship between the air gap thickness and the MTF in an information recording disc having a coating not satisfying the anti-reflection condition.

It should be noted that even a three-layered coat consisting of $SiO_2$, SiN, and $SiO_2$ has no effect to suppress deterioration of the MTF if under a condition other than the anti-reflection condition as shown in FIG. 21, FIG. 22, and FIG. 23.

In the information recording disc according to the present invention, the air gap between the SIL and the information recording disc is assumed to be a thin film and for a light flux incident from the SIL, an anti-reflection coating is arranged on the enhancement layer, i.e., the reflection film, the second dielectric film, the signal recording layer, and the first dielectric film, thereby facilitating the design method.

It should be noted that the object of the present invention is to increase the efficiency of the optical connection in a recording medium of a configuration not having a cover layer as well as to facilitate production of the recording medium. The present invention is not to be limited to an information recording disc and an information recording/reproducing apparatus employing the so-called near-field technique.

As has been described above, in the information recording disc and the information recording/reproducing apparatus according to the present invention, the information recording disc has a surface coated by the anti-reflection coating and accordingly, the first dielectric film can have a low reflectance for light rays of a wide range of the incident angle and it is possible to obtain a high coupling efficiency which changes gently against a change of the air gap thickness.

Moreover, the outermost surface opposing to the focusing element is made from $SiO_2$. Accordingly, even when the focusing element collides into the outermost surface, the signal recording layer weak to oxidization will not be easily exposed.

Furthermore, since the outermost surface is made from a thick $SiO_2$ film, it is possible to perform burnishing. Accordingly, it is possible to remove any protrusions formed due to an abnormal discharge in the sputtering step during a film formation of the signal recording layer. In this case, since the fifth dielectric film serving as the outermost surface has a thickness not less than 100 nm, a gentle margin is available in burnishing.

When the focusing element collides into the surface portion and a peel-off is caused, the data loss is caused only in the portion where the anti-reflection coating has been peeled off, which is significantly smaller than the case when the anti-reflection coating film is formed on the side of the focusing element and the film is peeled off.

The anti-reflection coating of the information recording disc has an effect to suppress aberration for the medium, which facilitates the recording margin to become wider and no rubbish is easily generated.

Furthermore, the calculation result of the MTF (modulation transfer function) shows that even when the air gap between the focusing element and the information recording disc increases its thickness, deterioration is small. That is, the anti-reflection coating on the surface of the information recording disc significantly suppresses deterioration of the MTF.

Moreover, in the case of the phase change type optical disc, the phase change does not affect much and a wide reproduction margin is available.

That is, the present invention enables to provide an information recording disc having a sufficient margin for the change of the thickness of the air gap between the focusing element and an information recording disc when recording/reproducing an information signal using the so-called near-field technique. Even when a collision with the focusing element occurs, it is possible to minimize the data loss. The information recording disc has a film configuration which can easily be formed.

Furthermore, the present invention enables to provide an information recording/reproducing apparatus for recording/reproducing an information signal using the aforementioned information recording disc and using the so-called near-field technique, the apparatus having a sufficient margin for the thickness change of the air gap between the information recording disc and the focusing element. Moreover, even when the information recording disc collides into the focusing element, the apparatus can minimize the data loss.

What is claimed is:

1. An information recording disc including:
   a signal recording layer for use in an information recording/reproducing apparatus having a light source for emitting a light flux and a focusing element for focusing the light flux to be applied to the signal recording layer; and
   a first dielectric layer between said signal recording layer and said focusing element,
   wherein the distance between the focusing element and a surface portion facing to the focusing element is not greater than a wavelength of the light flux,
   wherein the surface portion facing to the focusing element is coated with an anti-reflection coating film,
   wherein a first dielectric film is on the signal recording layer, and
   the anti-reflection coating layer is on the first dielectric film, so as to prevent reflection of the light flux incident into the first dielectric film.

2. The information recording disc as claimed in claim 1, wherein the anti-reflection coating film is formed by three or more layers of dielectric films.

3. The information recording disc as claimed in claim 1, wherein a first dielectric film is formed on the signal recording layer, and
   the anti-reflection coating layer is formed on the first dielectric film, so as to prevent reflection of the light flux incident into the first dielectric film.

4. The information recording disc as claimed in claim 3, wherein the anti-reflection coating layer has a thickness greater than the thickness of the signal recording layer.

5. The information recording disc as claimed in claim 3, wherein the anti-reflection coating layer has a thickness not less than 100 nm.

6. The information recording disc as claimed in claim 3, wherein the surface portion is smooth and flat.

7. The information recording disc as claimed in claim 1, wherein a second dielectric film is on the opposite side of the signal recording layer not facing the focusing element and a reflection film is at a lower side of the second dielectric film, and
   wherein the first dielectric film, the signal recording layer, the second dielectric film, and the reflection film generates an enhancement effect for a component of the light flux incident into the signal recording layer which component is in the normal line direction against the signal recording layer.

8. The information recording disc as claimed in claim 1, wherein said anti-reflection coating film is between said signal recording layer and said first dielectric layer, said anti-reflection coating film including:
   a third dielectric film between said signal recording layer and said focusing element;
   a fourth dielectric film between said third dielectric film and said focusing element;
   a fifth dielectric film between said fourth dielectric film and said focusing element.

9. The information recording disc as claimed in claim 8, wherein said fourth dielectric film is a SiN film.

10. An information recording/reproducing apparatus comprising:
    a rotation mechanism for holding and rotating an information recording disc;
    a substrate;
    a reflection film, said reflection film being between said signal recording layer and said substrate;
    a second dielectric layer, said second dielectric layer being between said signal recording layer and said reflection film;
    a light source; and
    a focusing element for focusing a light flux emitted from the light source so as to be applied to a signal recording layer of the information recording disc;
    wherein the information recordingdisc is used in such a manner that a distance between the focusing element and the surface portion facing to this focusing element is not greater than a wavelength of the light flux, and the information recording disc includes an anti-reflection coating film on the surface portion facing to the focusing element, the information recording disc includes a first dielectric film on the signal recording layer, and the anti-reflection coating layer of the information recording disc is on the first dielectric film, so as to prevent reflection of the light flux incident into the first dielectric film.

11. The information recording/reproducing apparatus as claimed in claim 10, wherein the anti-reflection coating film of the information recording disc is formed by three or more layers of dielectric films.

12. The information recording/reproducing apparatus as claimed in claim 10, wherein the information recording disc includes a first dielectric film formed on the signal recording layer, and the anti-reflection coating layer of the information recording disc is formed on the first dielectric film, so as to prevent reflection of the light flux incident into the first dielectric film.

13. The information recording/reproducing apparatus as claimed in claim 12, wherein the anti-reflection coating layer of the information recording disc has a thickness greater than the thickness of the signal recording layer.

14. The information recording/reproducing apparatus as claimed in claim 11, wherein the anti-reflection coating layer of the information recording disc has a thickness not less than 100 nm.

15. The information recording/reproducing apparatus as claimed in claim 12, wherein the surface portion of the information recording disc is smooth and flat.

16. The information recording/reproducing apparatus as claimed in claim 10, wherein the information recording disc includes a second dielectric film on the opposite side of the signal recording layer not facing the focusing element and a reflection film at a lower side of the second dielectric film, and wherein the first dielectric film, the signal recording layer, the second dielectric film, and the reflection film generates an enhancement effect for a component of the light flux incident into the signal recording layer which component is in the normal line direction against the signal recording layer.

17. The information recording/reproducing apparatus as claimed in claim 10, further comprising:

a first dielectric layer between said signal recording layer and said focusing element.

18. The information recording/reproducing apparatus as claimed in claim 10, wherein said anti-reflection coating film is between said signal recording layer and said first dielectric film, said anti-reflection coating film including:

a third dielectric film between said signal recording layer and said focusing element;

a fourth dielectric film between said third dielectric film and said focusing element;

a fifth dielectric film between said fourth dielectric film and said focusing element.

19. The information recording/reproducing apparatus as claimed in claim 18, wherein said third dielectric film is a $SiO_2$ film.

20. The information recording/reproducing apparatus as claimed in claim 18, wherein said fourth dielectric film is a SiN film.

21. The information recording/reproducing apparatus as claimed in claim 18, wherein said fifth film is a $SiO_2$ film.

22. An information recording disc comprising:

a signal recording layer, a focusing element focusing a light flux onto said signal recording layer;

a first dielectric layer, said first dielectric layer being between said signal recording layer and said focusing element;

a substrate;

a reflection film, said reflection film being between said signal recording layer and said substrate;

a second dielectric layer, said second dielectric layer being between said signal recording layer and said reflection film;

an anti-reflection coating film, said anti-reflection coating film reducing reflection of said light flux incident into said first dielectric layer, said anti-reflection coating film including:

a third dielectric film between said signal recording layer and said focusing element;

a fourth dielectric film between said third dielectric film and said focusing element;

a fifth dielectric film between said fourth dielectric film and said focusing element.

23. The information recording disc as claimed in claim 22, wherein an air gap is adjacent and in contact with said third anti-reflection coating film.

24. The information recording disc as claimed in claim 22, wherein said third anti-reflection coating film has a thickness of not less than approximately 100 nm.

25. The information recording disc as claimed in claim 22, wherein said third dielectric film is a $SiO_2$ film.

26. The information recording disc as claimed in claim 22, wherein said fourth dielectric film is a SiN film.

27. The information recording disc as claimed in claim 22, wherein said fifth film is a $SiO_2$ film.

28. The information recording disc as claimed in claim 22, wherein an outer surface of said anti-reflection coating film is $SiO_2$;

an air gap being between said anti-reflection coating film and said focusing element, said air gap being adjacent and in contact with said $SiO_2$.

29. The information recording disc as claimed in claim 22, wherein said first dielectric layer is adjacent and in contact with said signal recording layer;

said anti-reflection coating film is adjacent and in contact with said first dielectric layer.

30. The information recording disc as claimed in claim 22, wherein said signal recording layer is $Ge_2Sb_2Te_5$.

31. The information recording disc as claimed in claim 22, wherein said signal recording layer is TbFeCo and GbFeCo.

32. The information recording disc as claimed in claim 22, wherein:

said reflection film is a metal;

said first dielectric layer is a $ZnS—SiO_2$ film;

said second dielectric layer is a $ZnS—SiO_2$ film.

33. The information recording disc as claimed in claim 22, wherein:

said reflection film is a metal;

said first dielectric layer is a SiN film;

said second dielectric layer is a SiN film.

34. The information recording disc as claimed in claim 22, wherein said focusing element is a solid immersion lens.

35. The information recording disc as claimed in claim 34, wherein an air gap being between said anti-reflection coating film and said focusing element, said air gap having a width not greater than the wavelength of said light flux.

* * * * *